(12) United States Patent
McKeoun et al.

(10) Patent No.: US 7,243,971 B1
(45) Date of Patent: Jul. 17, 2007

(54) BED LINER CLIP

(75) Inventors: Vincent M. McKeoun, N. Branch, MI (US); Thomas G. Sierakowski, Metamora, MI (US); Christopher John Rudy, Fort Gratiot Township, MI (US)

(73) Assignee: Durakon Industries, Inc., Lapeer, MI (US)

( * ) Notice: Subject to any disclaimer, the term of this patent is extended or adjusted under 35 U.S.C. 154(b) by 92 days.

(21) Appl. No.: 11/095,744

(22) Filed: Mar. 23, 2005

Related U.S. Application Data

(60) Provisional application No. 60/556,543, filed on Mar. 26, 2004, provisional application No. 60/556,545, filed on Mar. 26, 2004.

(51) Int. Cl.
*B62D 33/00* (2006.01)
(52) U.S. Cl. .......................... 296/39.2; 24/563
(58) Field of Classification Search .............. 296/39.1, 296/39.2; 24/297, 296, 295, 294, 293, 291, 24/289, 453, 543, 563, 573.1, 522, 458; 52/718.1
See application file for complete search history.

(56) References Cited

U.S. PATENT DOCUMENTS

| | | |
|---|---|---|
| 2,853,913 A | 9/1958 | Rapata |
| 3,029,486 A | 4/1962 | Raymond |
| 3,093,027 A | 6/1963 | Rapata |
| 3,093,874 A | 6/1963 | Rapata |
| 4,122,583 A | 10/1978 | Grittner et al. |
| 4,181,349 A | 1/1980 | Nix et al. |
| 4,305,182 A | 12/1981 | Peterson |
| 4,470,737 A | 9/1984 | Wollar |
| 4,540,214 A | 9/1985 | Wagner |
| 4,572,568 A | 2/1986 | Kapp et al. |
| 4,575,146 A | 3/1986 | Marcos |
| 4,595,229 A | 6/1986 | Wagner |
| 4,659,133 A | 4/1987 | Gower |

(Continued)

FOREIGN PATENT DOCUMENTS

AU 250088 10/1962

(Continued)

OTHER PUBLICATIONS

McKeoun et al., U.S. Appl. No. 60/556,545, filed Mar. 26, 2004 A.D.

(Continued)

*Primary Examiner*—Lori L. Lyjak
(74) *Attorney, Agent, or Firm*—Christopher John Rudy

(57) ABSTRACT

Clip for attaching a bed liner to a cargo area of a vehicle such as a pickup truck can include a body to which is attached an ear, and attached to the ear, a toe that can engage a vertical portion of a wall of the bed liner; optionally, a hole may be provided in the body to disengage the toe from the bed liner wall opposite the toe. The clip in another embodiment can include a body to which is attached a biasing upper extension arm, and a laterally directed retaining member, and between the body and the laterally directed retaining member is provided at least one gap for receiving a wall portion of the bed liner; optionally, a recess may be provided to accommodate a blind lip tab of the pickup truck cargo area wall.

20 Claims, 3 Drawing Sheets

U.S. PATENT DOCUMENTS

| | | |
|---|---|---|
| 4,677,714 A | 7/1987 | Wright |
| 4,708,895 A | 11/1987 | Mizusawa |
| 4,740,026 A | 4/1988 | Wagner |
| 4,740,027 A | 4/1988 | Ormiston |
| 4,750,776 A | 6/1988 | Barben |
| 4,768,822 A | 9/1988 | Gower |
| 4,796,942 A | 1/1989 | Robinson et al. |
| 4,850,633 A | 7/1989 | Emery |
| 4,906,040 A | 3/1990 | Edwards |
| 4,924,561 A | 5/1990 | Yoneyama |
| 5,046,775 A | 9/1991 | Marcum, Jr. et al. |
| 5,150,940 A | 9/1992 | Kennedy |
| 5,267,820 A | 12/1993 | Sturtevant |
| 5,345,658 A | 9/1994 | Kennedy |
| 5,364,150 A | 11/1994 | Cochran et al. |
| 5,513,934 A | 5/1996 | German |
| 5,782,520 A | 7/1998 | Smith |
| 5,893,599 A | 4/1999 | Strohfeldt |

FOREIGN PATENT DOCUMENTS

| | | |
|---|---|---|
| FR | 1364535 | 6/1964 |
| FR | 1576385 | 8/1969 |

OTHER PUBLICATIONS

Rudy et al., U.S. Appl. No. 60/556,543, filed Mar. 26, 2004 A.D.

Durakon Industries, Inc., instruction sheet for a Dodge Ram 1500 liner fastener (Sep. 12, 2002).

Penda Corporation, Bedliner Installation Instructions for an over rail bedliner and fastener (Jun. 1993).

The Colonel's Inc., Installation Instructions for fastening bedliners with an overrail fastener clip.

BED LINER CLIP

CROSS-REFERENCE CLAIMS OF PRIORITY

This claims benefits under 35 USC 119(e) of U.S. provisional patent application Nos. 60/556,543 and 60/556,545 both of which were filed on Mar. 26, 2004 A.D. The specifications of both of those applications are incorporated herein by reference in their entireties.

BACKGROUND TO THE INVENTION

I. Field

The present invention concerns a clip for attaching a bed liner to a cargo area of a vehicle such as a pickup truck. It may concern such a clip for an over the rail bed liner.

II. Art

Various clip devices are known for attaching bed liners to the beds of pickup trucks. See, e.g., U.S. Pat. Nos. 4,122,583 to Grittner et al.; 4,572,568 to Kapp et al.; 4,595,229 to Wagner; 4,740,026 to Wagner; 4,740,027 to Ormiston; 4,750,776 to Barben; 4,768,822 to Gower; 4,850,633 to Emery; 5,046,775 to Marcum, Jr. et al.; 5,267,820 to Sturtevant; 5,364,150 to Cochran et al.; 5,513,934 to German; and 5,782,520 to Smith. Compare, U.S. Pat. No. 4,305,182 to Peterson. See also, U.S. Pat. Nos. 2,853,913 to Rapata, 3,029,486 to Raymond, 3,093,027 to Rapata, 3,093,874 to Rapata, 4,181,349 to Nix et al. 4,470,737 to Wollar, 4,540, 214 to Wagner, 4,575,146 to Markos, 4,659,133 to Gower, 4,677,714 to Wright, 4,708,895 to Mizasawa, 4,796,942 to Robinson et al., 4,906,040 to Edwards, 4,924,561 to Yoneyama, 5,150,940 to Kennedy, 5,345,658 to Kennedy, and 5,893,599 to Strohfeldt; Australian patent No. 250,088 (Oct. 11, 1962), and French patent Nos. 1,364,535 (1964) and 1,576,385 (1969); and Durakon Industries, Inc., instruction sheet (Sep. 12, 2002) for a Dodge Ram 1500 liner fastener, Penda Corporation, Bedliner Installation Instructions (6/93) for an over rail bedliner and fastener, and The Colonel's Inc., Installation Instructions for fastening bedliners with an overrail fastener clip.

Among problems with some of these can be mentioned complexity or multi-part construction. Others do not hold as securely as desired. Some are cost prohibitive. Some require downward pressure on the bed liner through a flexible lower arm.

It would be good to ameliorate or overcome such problems.

DISCLOSURE OF THE INVENTION

In general, the present invention provides a clip for attaching a bed liner to a cargo area of a vehicle such as a pickup truck, which in one embodiment comprises a body to which is attached an ear, and attached to the ear, a toe that can engage a vertical portion of a wall of the bed liner; optionally, a hole may be provided in the body to disengage the toe from the bed liner wall opposite the toe. The clip in another embodiment comprises a body to which is attached a biasing upper extension arm, and a laterally directed retaining member, and between the body and the laterally directed retaining member is provided at least one gap for receiving a wall portion of the bed liner; optionally, a recess may be provided to accommodate a blind lip tab of the pickup truck cargo area wall.

The invention is useful in vehicular and cargo management.

Significantly, by the invention, one or more problems of the art is or are ameliorated or overcome. Among other things, the toe-containing clip does not require downward pressure on the bed liner wall from a flexible member, notably a lower arm; and the arm-containing clip is effective in providing a secure hold with its downward pressure especially with a flexible upper finger. Both embodiments of the invention are simple to manufacture and install, and can securely hold a bed liner for a pickup truck in place, especially an over the rail bed liner. The clip may be embodied as a "toe" and/or "finger" clip.

Numerous further advantages attend the invention.

BRIEF DESCRIPTION OF THE SEVERAL VIEWS OF THE DRAWINGS

The drawings form part of the specification hereof. With respect to the drawings, which are not necessarily drawn to scale, the following is briefly noted.

DETAILED DESCRIPTION OF ILLUSTRATIVE EMBODIMENTS OF THE INVENTION

Figure 1:
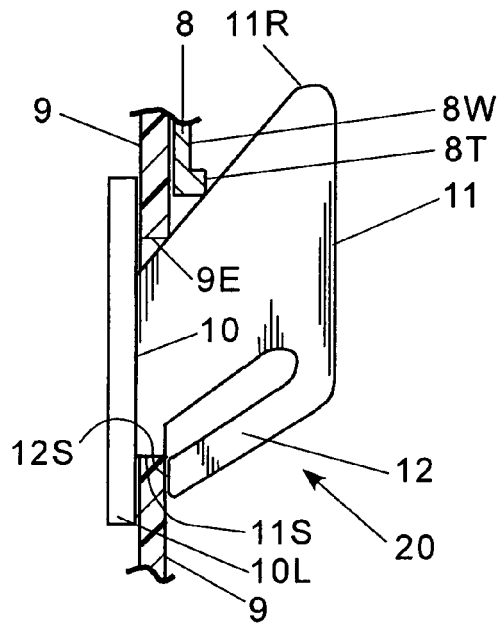
FIG. 1 is a side view of a bed liner clip of the invention, embodied as a toe clip, installed to secure a bed liner to a pickup truck bed, with the liner and bed shown in section.
Figure 2:
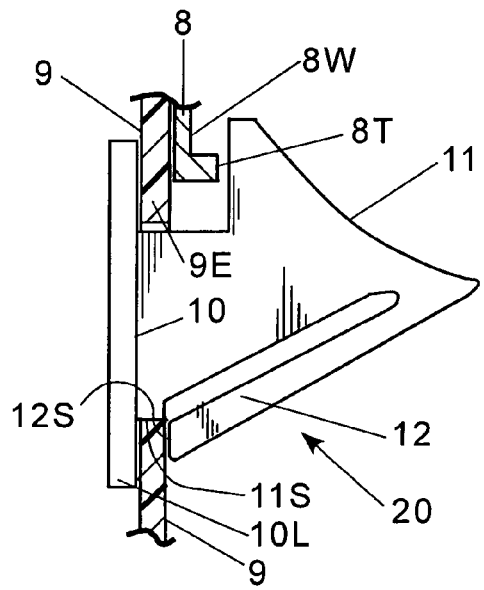
FIG. 2 is a side view of another embodiment of a bed liner toe clip of the invention, installed to secure a bed liner to a pickup truck bed, with the liner and bed shown in section.
Figure 3:
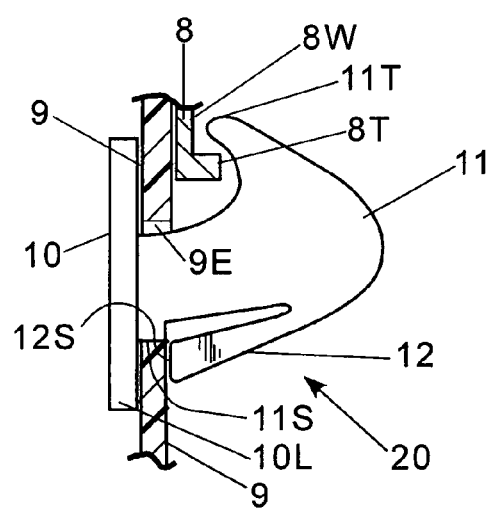
FIG. 3 is a side view of another embodiment of a bed liner toe clip of the invention.
Figure 4:
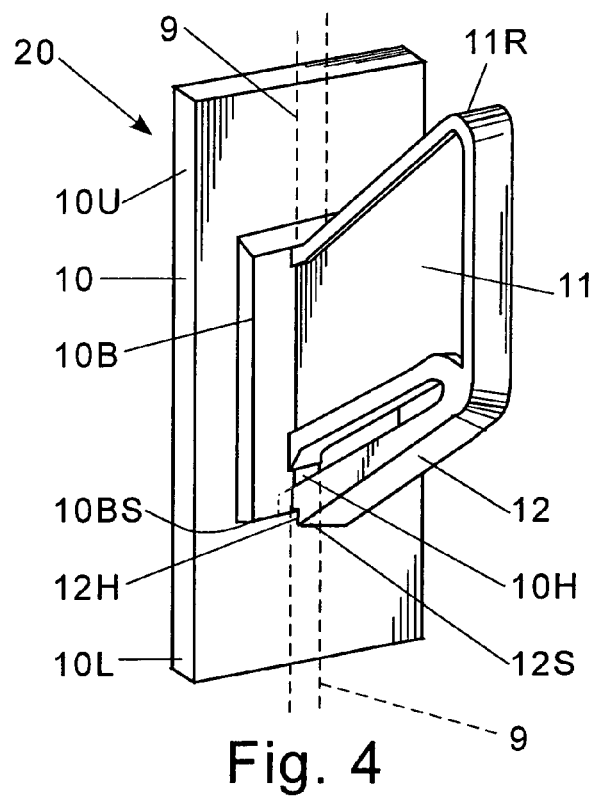
FIG. 4 is a rear, perspective view of another embodiment of a bed liner toe clip of the invention.
Figure 5:
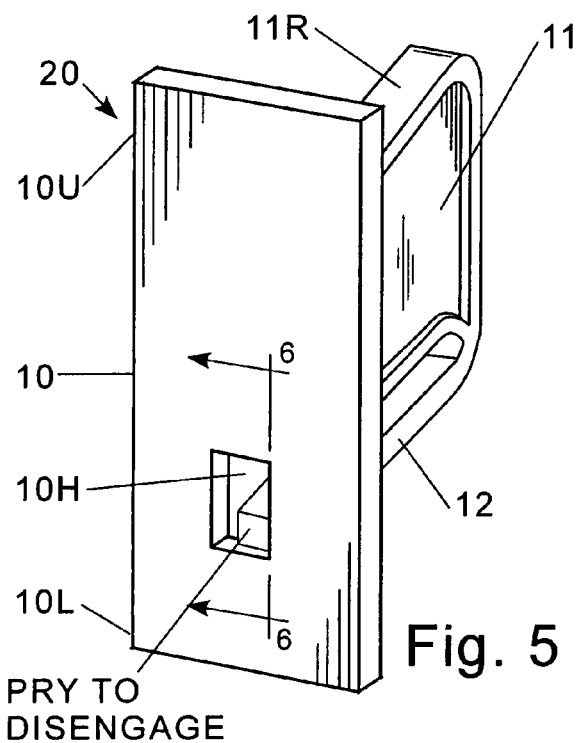
FIG. 5 is a front, perspective view of the clip of FIG. 4.
Figure 6:
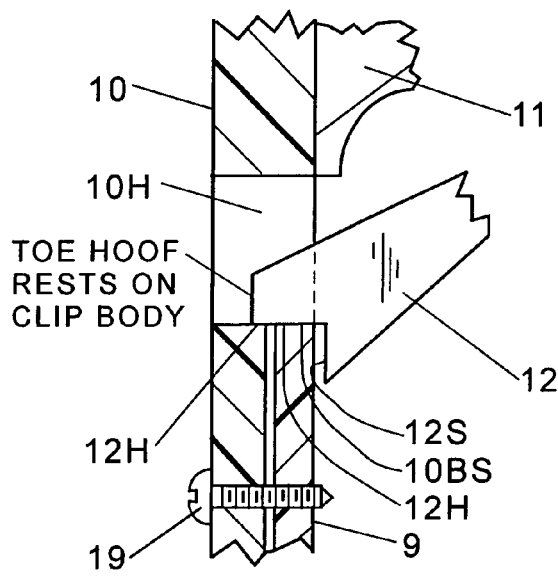
FIG. 6 is a sectional view of part of the clip of FIGS. 4 and 5, taken along 6-6 in FIG. 5, installed to secure a bed liner to a pickup truck bed, with the liner also shown in section.
Figure 7:
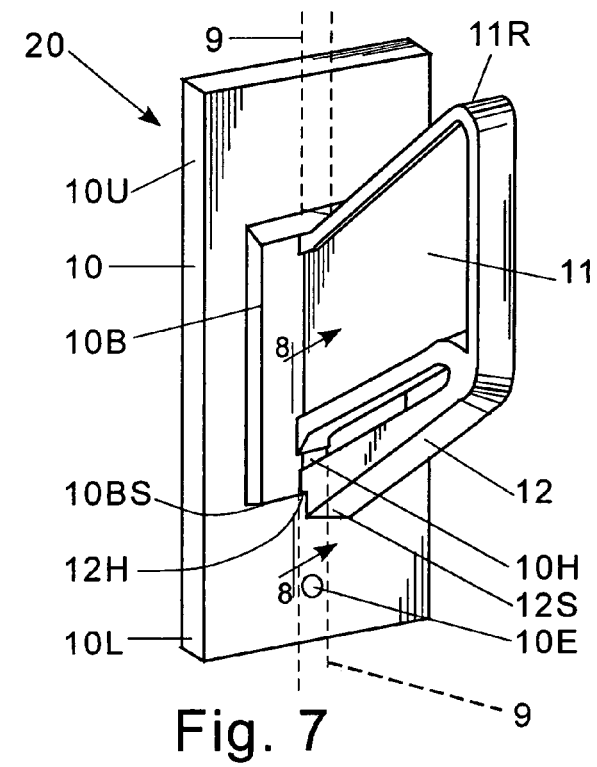
FIG. 7 is a rear, perspective view of another embodiment of a bed liner toe clip of the invention.
Figure 8:
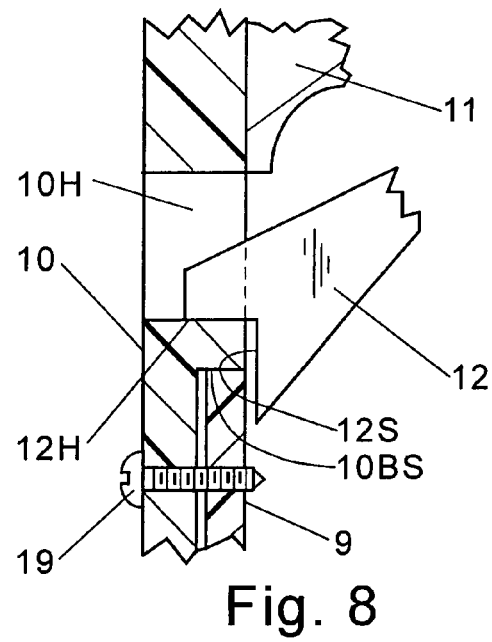
FIG. 8 is a sectional view of part of the clip of FIG. 7, taken along 8-8 in FIG. 7, installed to secure a bed liner to a pickup truck bed, with the liner also shown in section.

The invention can be further understood by the detail below, which may read in view of the drawings. Such is to be taken in an illustrative and not necessarily limiting sense.

The bed liner clip of the invention is made for attaching a removable bed liner to the cargo area of a vehicle. For example, the vehicle can be a pickup truck. The liner may be an over the rail bed liner for installation in the cargo area of a pickup truck for which the liner is beneficially adapted.

The clip can be made of a plurality of pieces and assembled. Preferably, however, the clip is made of one piece, i.e., it is monolithic. Nonetheless, additional devices may be present, for example, an additional fastener, even with the monolithic clip.

The clip can be made of any suitable material. It may be made, for instance, of a suitable metal or plastic. Preferably, however, a suitable plastic is employed that is suitably stiff or stout, yet resilient. For example, the plastic may be a polyolefin such as a polypropylene, a nylon, an so forth. The plastic may be filled with a suitable filler.

The clip may be made by any suitable method. It may be made, for instance, by machining a block of the suitable material, or by molding, which may be followed by any necessary machining. A clip of the preferred plastic is desirably injection molded.

The clip may have any suitable dimensions.

With reference to the drawings, clip 20 is for attaching to a wall 8 of a pickup truck cargo area, which may have upper lip 8L (e.g., FIG. 11), blind lip tab 8T, general outer vertical component 8V (e.g., FIG. 11) and inner wall 8W, removable bed liner 9 through bed liner eye hole 9E. The hole 9E may be of any suitable configuration, say, circular, square or rectangular, for example, the rectangle having height 9H (e.g., FIG. 11) of about 32 mm and a width perpendicular to the height of about 25 mm.

With particular reference to FIGS. 1-8, the clip 20 is embodied as a toe clip, which as depicted is monolithic plastic, and includes body 10 of suitable thickness, say, about from 12-20 mm, in which may be found element-holding hole 10E and more desirably through-hole 10H from front to back. The body 10 may have built up inner base 10B with base shoulder 10BS that can abut against the liner 9 when the clip 20 is in place through the hole 9E. The body 10 may have lower portion 10L, and upper portion 10U, and have any desired width, say, about from 5 mm to 50 mm, to include about from 10 mm to 30 mm, for example, about 20 mm. Ear 11 can extend laterally from the body 10 and be of a suitable thickness and include ramp 11R that can press against side rail sheet metal of the inner wall 8W or tab 8T, or may have surface 11S for facing or touching the tab 8T or wall 8W, or tab 11T for facing or touching the wall 8W or the upper lip of the wall 8 of the pickup truck cargo area. To the ear 11 is attached biasing toe 12 that may be a depending member, which may have lower hoof 12H that typically contacts the body 10 on a surface provided by the hole 10H. The biasing toe 12 terminates in terminal surface 12S, which may contact the inside vertical wall of the liner 9 without downward force on the liner 9 through contact of the liner 9 in its hole 9E. Preferably, the biasing toe 12 is flexible. In lieu of the biasing toe 12 and its surface 12S, a latch akin to the bolt of a door knob assembly may be provided to depend from the ear 11. The latch may be biased by a spring to keep it in place against the inside vertical wall of the bed liner 9. Such an arrangement, however, is less simple than monolithic construction of the clip 20. A depending orientation may be provided as an upraised one. Typical engagement of the clip with the wall 8 and liner 9 through hole 9E is carried out by inserting the ear 11 through the hole 9E and pushing on the body 10 until the biasing toe 12 snaps downward. When the hole 12H is provided, the biasing toe 12 may be pried to disengage the clip 20 after the clip 20 has been engaged, and the clip 20 may be removed by pulling it out. Additional parts or devices may be present. For example, an additional fastener such as screw 19 may be passed through the hole 10E threaded into the liner 9 to further secure the clip 20.

Figure 9:
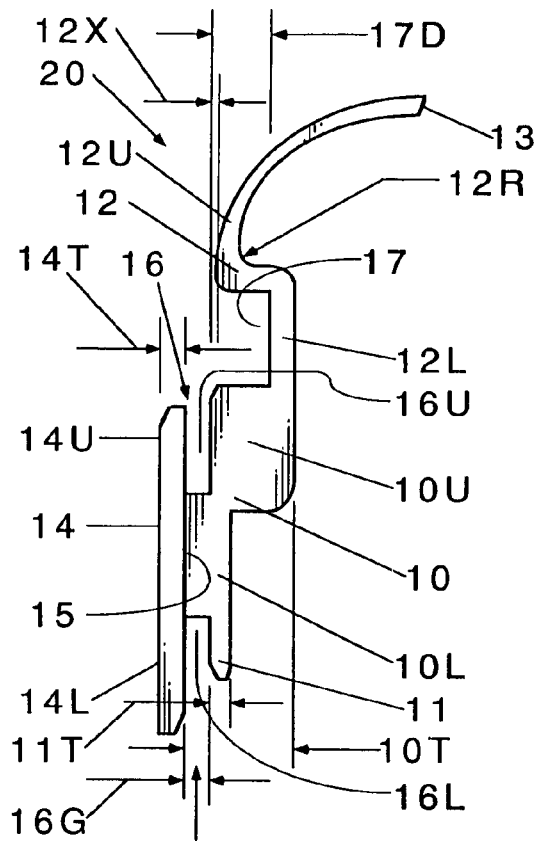
FIG. 9 is a side view of a bed liner clip of the invention, embodied as a finger clip.
Figure 10:
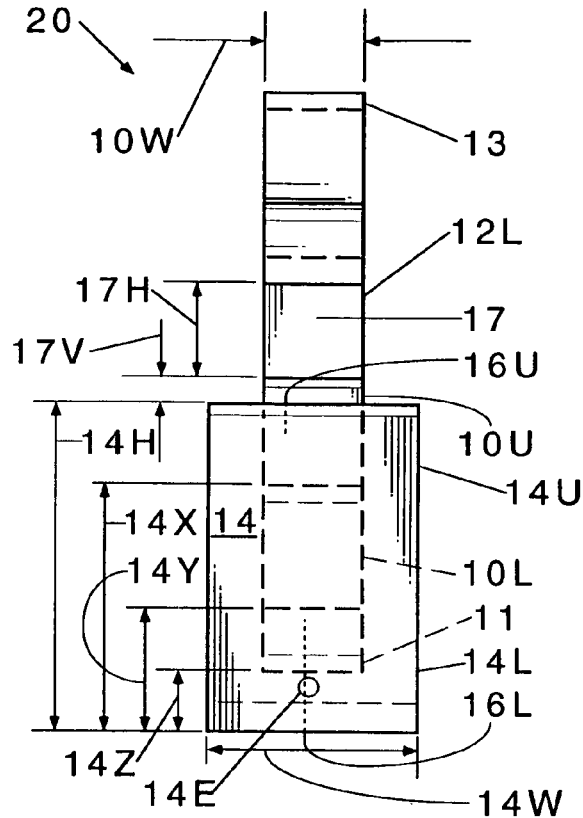
FIG. 10 is a front plan view of the clip of FIG. 9.
Figure 11:
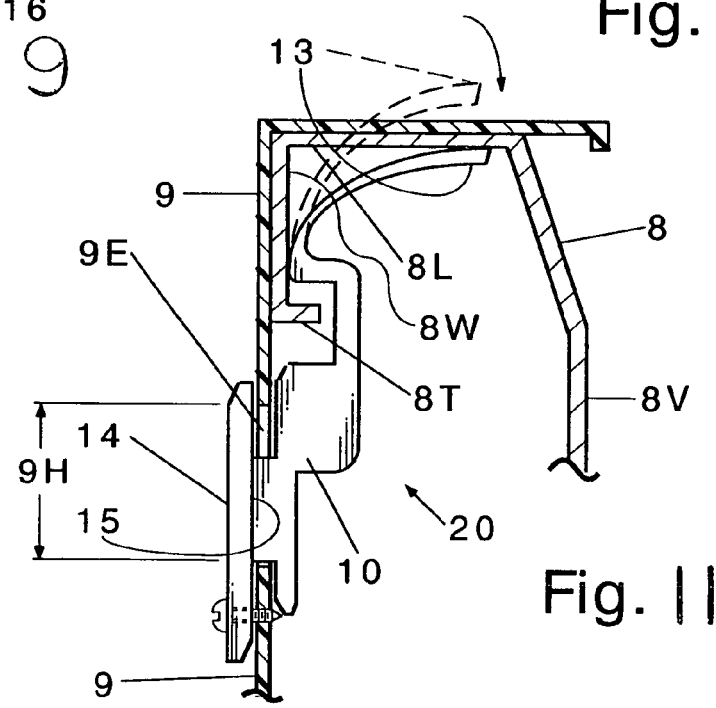
FIG. 11 is a side plan view of the clip of FIGS. 9 and 10, installed to secure a bed liner to a pickup truck bed, with the liner and bed shown in section.

With particular reference to FIGS. 9-11, the clip 20 is embodied as a finger clip, which as depicted is monolithic and made of polypropylene with fillers or nylon, and includes body 10, which may have lower portion 10L, thickness 10T, for example, about 16 mm, and upper portion 10U, and have any desired width 10W, say, about from 5 mm to 50 mm, to include about from 10 mm to 30 mm, for example, about 20 mm. Lower back appendix 11 may depend from the body 10 and have thickness, for example, about 3¼ mm. To the body 10 is attached biasing upper extension arm 12, which may have lower portion 12L and upper portion 12U, which may contact the inside wall 8W, and which can extend into more flexible finger 13 that can contact the upper lip 8L and provide for increased biasing force downward. Inside arm radius 12R, say, about 2 mm, may advantageously be provided to strengthen and temper flexing of the finger 13, and set off 12X, say, of about 2 mm, may be provided in the arm 12. To the body 10 is also attached laterally directed retaining member 14, which may have optional eye hole 14E for passage of a securing fastener and may have lower portion 14L and upper portion 14U. The retaining member 14 may be of any suitable size or shape, for example, being in the form of a rectangular box, which can include height 14H, for example, about 53 mm; thickness 14T, say, about from 1 mm to 5 mm, to include about from 2 mm to 4 mm, for example, about 3.25 mm; and width 14W, for example, about 40 mm. Features of the body 10 in conjunction with the retaining member 14 may define various other dimensions to include distances 14X, 14Y and 14Z, which, respectively can be, for example, about 38 mm, about 16 mm and about 6 mm. The retaining member 14 has rear face 15 wherever the body 10 is not contiguous therewith. Between the body 10 and the laterally directed retaining member 14 is provided at least one gap 16, which may have gap dimension 16G, say, about 4.5 mm, for receiving a wall portion of the bed liner 9. Between the appendix 11 and the rear face 15 may be lower gap 16L, and between body upper portion 10U and the rear face 15 may be upper gap 16U. Preferably, both the lower and upper gaps 16L, 16U are present. Recess 17 may be provided to accommodate the blind lip tab 8T of the pickup truck cargo area wall 8. Any suitable dimensions for the recess 17 may be provided, to include, for example, depth 17D of about 8 mm, height 17H of about 16 mm, and a vertical set off 17V of about 3 mm. Such a recess may not be present in embodiments that are engineered for pickup truck walls 9 without such a tab, or in other cases where contact with the inner wall 8W is not to be carried out. Additional parts or devices may be present. For example, an additional fastener such as screw 19 may be passed through the hole 14E threaded into the liner 9 to further secure the clip 20. The clip 20 is installed finger 13 first through the eye hole 9E. As it is inserted, the finger 13 hits the upper lip 8L and deflects, allowing the lower gap 16L defined by the appendix 11 and member rear wall 15 to install over the bottom portion of the liner wall immediately beneath the hole 9E. Once the lower gap 16L is engaged by the bed liner 9, the clip 20 is allowed to release and be forced downward through the force exerted by the resilient, compressed arm 12 and finger 13. The clip 20 then seats fully into the lower gap 16L, and the arm 12 and finger 13 remain with force keeping the clip 20 in place. To remove the clip 20, the above actions are followed in reverse.

CONCLUSION TO THE INVENTION

The present invention is thus provided. Various features, parts, subcombinations or combinations may be employed with or without reference to other features, parts, subcombinations and combinations in the practice of the invention, and numerous adaptations and modifications can be effected within its spirit, the literal claim scope of which is particularly pointed out as follows:

We claim:

1. A clip for attaching a bed liner to a cargo area of a vehicle having the cargo area, which comprises a body to which is attached an ear that protrudes from the body, and, directly attached to the ear, a toe that extends toward the body and can engage a vertical portion of a wall of the bed liner.

2. The clip of claim 1, wherein a hole is provided in the body to disengage the toe from the bed liner wall opposite the toe when the clip is installed.

3. The clip of claim 1, wherein the toe terminates in a terminal surface, which can contact an inside vertical wall of the bed liner without downward force on the bed liner through contact of the bed liner in a hole in the bed liner.

4. The clip of claim 2, wherein the toe terminates in a terminal surface, which can contact an inside vertical wall of the bed liner without downward force on the bed liner through contact of the bed liner in a hole in the bed liner.

5. The clip of claim 1, wherein the toe is flexible.

6. The clip of claim 1, which is made of a suitably stout yet resilient plastic, and which is monolithic.

7. A clip for attaching a bed liner to a cargo area of a vehicle having the cargo area, which comprises a body to which is attached a biasing upper extension arm, and a laterally directed retaining member, and between the body and the laterally directed retaining member is provided an upper gap and a lower gap for receiving a wall portion of the bed liner.

8. The clip of claim 7, which is made of a suitably stout yet resilient plastic, and which is monolithic.

9. The clip of claim 7, wherein the biasing upper extension arm culminates in a flexible finger.

10. The clip of claim 7, wherein a recess is provided to accommodate a blind lip tab of the pickup truck cargo area wall.

11. The clip of claim 3, wherein the toe also has a lower hoof that can contact the body on a surface provided by a hole in the body.

12. The clip of claim 11, wherein the toe can be pried to disengage the clip after the clip has been engaged so that the clip can be removed by pulling it out, wherein the clip is made of a suitably stout yet resilient plastic, and is monolithic.

13. The clip of claim 1, wherein the toe is attached to the ear about a distal portion of the ear in relation to the body.

14. The clip of claim 13, wherein a hole is provided in the body to disengage the toe from the bed liner wall opposite the toe when the clip is installed.

15. The clip of claim 13, wherein the toe terminates in a terminal surface, which can contact an inside vertical wall of the bed liner without downward force on the bed liner through contact of the bed liner in a hole in the bed liner.

16. The clip of claim 14, wherein the toe terminates in a terminal surface, which can contact an inside vertical wall of the bed liner without downward force on the bed liner through contact of the bed liner in a hole in the bed liner.

17. The clip of claim 13, wherein the toe is flexible.

18. The clip of claim 14, which is made of a suitably stout yet resilient plastic, and which is monolithic.

19. In combination, and assembled together, a combination comprising the following:
   a vehicle having a cargo area;
   a bed liner for the cargo area of the vehicle;
   at least one clip attaching the bed liner to the cargo area of the vehicle, which at least one clip is selected from the group consisting of:
   (A) a clip embracing a body to which is attached an ear that protrudes from the body, and, directly attached to the ear, a toe that extends toward the body and can engage a vertical portion of a wall of the bed liner;
   (B) clip embracing a body to which is attached a biasing upper extension arm, and a laterally directed retaining member, and between the body and the laterally directed retaining member is provided an upper gap and a lower gap for receiving a wall portion of the bed liner; and
   (C) a combination of "A" and "B."

20. The combination of claim 19, wherein the at least one clip is a plurality of clips "A."

\* \* \* \* \*